United States Patent [19]
Iverson et al.

[11] Patent Number: 6,031,683
[45] Date of Patent: Feb. 29, 2000

[54] METHOD FOR OPTIMIZATION OF SEEK AND SETTLE PERFORMANCE IN HARD DISK DRIVES

[75] Inventors: David Eugene Iverson, Hayfield; Hal Hjalmar Ottesen; Gordon James Smith, both of Rochester; Donald R. Tobie, Zumbrota, all of Minn.

[73] Assignee: International Business Machines Corporation, Armonk, N.Y.

[21] Appl. No.: 08/990,585

[22] Filed: Dec. 15, 1997

[51] Int. Cl.[7] .................................................. G11B 5/596
[52] U.S. Cl. ................................... 360/78.04; 360/78.06; 360/78.14; 360/77.08; 360/63
[58] Field of Search .............................. 360/78.08, 78.01, 360/78.04, 78.06, 78.07, 78.14, 61, 63, 77.05, 77.08, 77.04; 369/34

[56] References Cited

U.S. PATENT DOCUMENTS

| | | | |
|---|---|---|---|
| 4,967,292 | 10/1990 | Moteki .............................. | 360/77.05 X |
| 5,126,897 | 6/1992 | Ogawa et al. .................... | 360/77.05 X |
| 5,245,487 | 9/1993 | Cunningham ...................... | 360/77.01 |
| 5,459,624 | 10/1995 | Erickson et al. ................. | 360/78.07 X |
| 5,677,808 | 10/1997 | Cha et al. ........................ | 360/78.04 X |
| 5,771,126 | 6/1998 | Choi ................................. | 360/77.08 X |

OTHER PUBLICATIONS

Patent Abstract of Japan, vol. 15, No. 88, (01–124331) Hibino et al., Head Positioning Control Circuit for Magnetic Disk Device, Mar. 4, 1991.

*Primary Examiner*—Andrew L. Sniezek
*Attorney, Agent, or Firm*—David W. Lynch

[57] ABSTRACT

A method and apparatus for optimizing the seek/settle performance of a storage device. The present invention measures the seek/settle performance for each individual head and selects the heads with the best seek/settle performance, i.e., access performance. The invention includes a processor for calculating velocity deviations for each of the plurality of heads to determine a set of suitable seek heads from the plurality of heads, a head selection circuit for switching from a current head to a preferred head from the set of suitable seek heads and an actuator controller for seeking with the preferred head to a virtual track corresponding to a target track. The processor calculates a preferred/target runout difference for smoothing the settle of the preferred head and the head selection circuit switches from the preferred head to a target head aligned with the target track. The preferred/target runout difference comprises the differences between the runout for the preferred head and the target head for N sectors and the preferred/target runout difference is provided to the actuator controller upon calculation by the processor. The head selection circuit switches from the preferred head to a target head aligned with the target track at a predetermined period before the target head is positioned at the target track. The preferred head is a randomly selected head from the set of suitable seek heads. The head selection circuit switches from the preferred head to a target head aligned with the target track for read operations.

24 Claims, 7 Drawing Sheets

METHOD FOR OPTIMIZATION OF SEEK AND SETTLE PERFORMANCE IN HARD DISK DRIVES

BACKGROUND OF THE INVENTION

1. Field of the Invention

This invention relates in general to a method and apparatus for optimizing the seek/settle performance of a storage device, and more particularly to a method and apparatus that measures the seek/settle performance for each individual head and selects the heads with the best seek/settle performance.

2. Description of Related Art

Disk drive units incorporating stacked, commonly rotated rigid magnetic disks are used for storage of data in magnetic form on the disk surfaces. Transducer heads driven in a path toward and away from the drive axis write data to the disks and read data from the disks. The data is recorded in concentric, radially spaced data information tracks arrayed on the surfaces on the disks.

Servo position control is used to position these data heads in registration with the data information tracks. One type of servo system uses a dedicated transducer head to read position signals recorded in servo information on a disk surface. The data heads are arranged with the servo head for simultaneous movement relative to the data information tracks and the servo information tracks. To access the disk drive unit, a feedback controlled drive system locates the servo head in a desired position, thereby to locate a data head in registration with a specific data information track where data is to be written or read.

However, other systems have servo positioning information prerecorded on the disk in servo sectors angularly spaced around the disk and located in the data tracks. The servo information is read and processed by a digital control system to control the amount of current sent to the voice coil motor (VCM). In this manner the head is maintained on track during read and write operations and accurately moved across the tracks to read and write on all the tracks.

There is usually significant variation in the access performance between recording heads in the same disk drive. This variation has been observed since the beginning of embedded servo control in disk drives. History has shown in disk drives using ferrite heads that wider heads would normally have better seek and settle performance due to more precise position error signal (PES) registration. For example, U.S. Pat. No. 5,245,478, issued Sep. 14, 1993, to Earl Cunningham, incorporated herein by reference, uses a dedicated servo head that is three times wider than the data heads thereby yielding a much better servo performance.

According to Cunningham, position error signals provided by conventional arrangements are subject to problems leading to difficulties in accurate and consistent head positioning during disk access. The signal detected by a servo transducer head of conventional width is effected strongly by the abrupt phase jumps between adjacent tracks. As a result, a conventional head is incapable of providing a smooth, linear position error signal. In addition, the signal is low in amplitude and is undesirably sensitive to variations in parameters including written track density, servo head dimensional tolerances and misregistration between servo and data tracks. Another disadvantage of prior conventional designs is that the position error signal is adversely affected by head jitter in the circumferential or time direction as well as jitter in the radial direction that may accompany non regular bearing runout during writing of the servo tracks.

In addition to these problems, yet another difficulty with the standard servo head arises from the effect of the edge fringe areas separating the written servo information. The nonmagnetized regions between tracks acts as dead zones in which non-signal change is detected in response to increments of radial servo head movement. The severity of this undesired effect depends upon servo head width compared to track width. If the head width is equal to an integer number of track widths, no gain in position error signal is present when both edges of the head are aligned with edge fringe areas. For other widths, gain is seriously accentuated when either edge of the head is aligned with an edge fringe area. Therefore, Cunningham suggests using a servo head three times wider than data heads to overcome these disadvantages. However, today drive manufacturers are constantly challenging the track density and the heads are getting narrower and narrower. Thus, wide heads as taught by Cunningham for reading servo signals would undermine the task of increasing track densities.

Still, other observations show that some MR heads with instability and/or asymmetric read sensitivity profiles have degraded servo. In fact there are several factors that contribute to poor seek and settle performance, which again points to degradation of signal-to-noise-ratio (SNR) in the position error signal (PES). Degradation in PES SNR will cause the seek performance and especially the settle-performance to be impaired. Tracking performance will always suffer from poor SNR.

There are several factors affecting seek/settle performance. For example, MR head instability and irregular read sensitivity profiles may affect seek/settle performance. MR head instability and irregular read sensitivity cause changes in the PES translation and therefore decrease the PES SNR. In addition, seek/settle performance may be affected by individual disk surface-coercivity and variation in coercivity across the data band. Variation in coercivity will cause variation in the erase-stripes surrounding the servo patterns on a particular disk surface. This results in decreased SNR in PES.

A third cause of seek/settle performance degradation involves the dynamic conditions of individual head/suspension/arm caused by variations in components and manufacturing tolerances. These dynamic conditions may, for example, have highly underdampened resonances due to a poor swage joint or a tilted head. Thus poor head/suspension/arm dynamics will affect the seek and especially the settle performance.

A large protruding defect on one disk surface may also cause problems if hit by the slider or MR element. Thermal asperities (TA) and slider roll during seek are just two examples. This will affect the SNR of the PES in local defect areas.

Furthermore, there might be more turbulent flow on the two outside surfaces of the disk pack causing slider buffeting. Inside the disk pack, observations show that the air flow is much more laminar. Slider buffeting and roll will change flyheight and consequently the PES.

Finally, the flyheight variation of the individual head as it passes over the data area during a seek may affect seek/settle performance. Variation in flyheight will cause some variation in PES.

As can be seen from these factors, PES SNR may be easily affected. There are multiple scenarios one can contrive to argue why the seek and settle performance will vary as a function of which head is used during the access. The position error signal will be an ambiguous function of these scenarios. The variations between heads are based in tolerances of components, manufacturing, and environment. In a modern disk drive, the PES signal and available gray code are used to guide (closed-loop) the seeking data head on a radial velocity profile setup between starting track and the target track. The position error signal (PES) figures heavily in the estimation of the radial head velocity, and the ability of the servo system to follow the prescribed velocity profile with a minimal amount of error. The heads inability to closely follow the velocity profile will result in longer settling times. This causes poorer access performance.

It can be seen then that there is a need for a method that optimized seek/settle performance.

SUMMARY OF THE INVENTION

To overcome the limitations in the prior art described above, and to overcome other limitations that will become apparent upon reading and understanding the present specification, the present invention discloses a method and apparatus for optimizing the seek/settle performance of a storage device.

The present invention solves the above-described problems by measuring the seek/settle performance for each individual head and selecting the heads with the best seek/settle performance, i.e., access performance.

A system in accordance with the principles of the present invention includes a processor for calculating velocity deviations for each of the plurality of heads to determine a set of suitable seek heads from the plurality of heads, a head selection circuit for switching from a current head to a preferred head from the set of suitable seek heads and an actuator controller for seeking with the preferred head to a virtual track corresponding to a target track. The processor calculates a preferred/target runout difference for smoothing the settle of the preferred head and the head selection circuit switches from the preferred head to a target head aligned with the target track.

Other embodiments of a system in accordance with the principles of the invention may include alternative or optional additional aspects. One such aspect of the present invention is that the preferred/target runout difference comprises the differences between the runout for the preferred head and the target head for N sectors.

Another aspect of the present invention is that the current head is the preferred head.

Another aspect of the present invention is that the preferred head is the target head.

Another aspect of the present invention is that the preferred/target runout differences is provided to the actuator controller upon calculation by the processor.

Another aspect of the present invention is that the head selection circuit switches from the preferred head to a target head aligned with the target track at a predetermined period before the target head is positioned at the target track.

Another aspect of the present invention is that the preferred head is a randomly selected head from the set of suitable seek heads.

Another aspect of the present invention is that the head selection circuit switches from the preferred head to a target head aligned with the target track in one servo sector period.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a improved method of optimizing seek/settle performance in a storage device.

Heads with inferior seek/settle performance are problematic from a customer perspective resulting in poor drive performance and possibly causing a predictive failure analysis (PFA) error for which a drive is replaced in the field. The method according to the present invention measures the seek/settle performance for each individual head, and selects the heads with the best seek/settle performance, i.e., access performance. These heads will then serve as preferred seek heads for all access operations for all heads. When the target cylinder has been reached, a head switch operation is done to reach the selected head if the selected head is not a preferred seek head.

Figure 1:
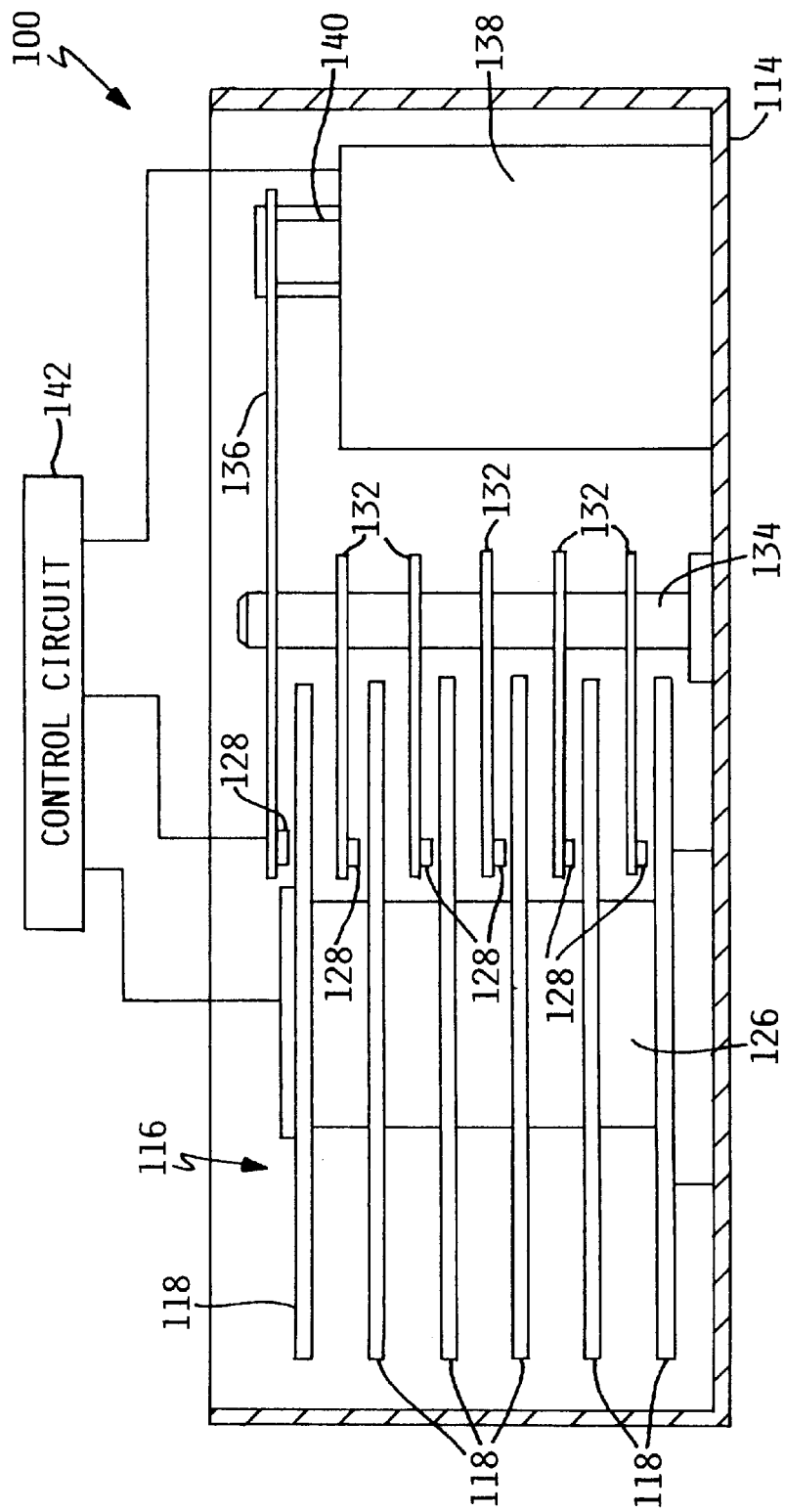
FIG. 1 illustrates a storage system according to the present invention.
Figure 2:
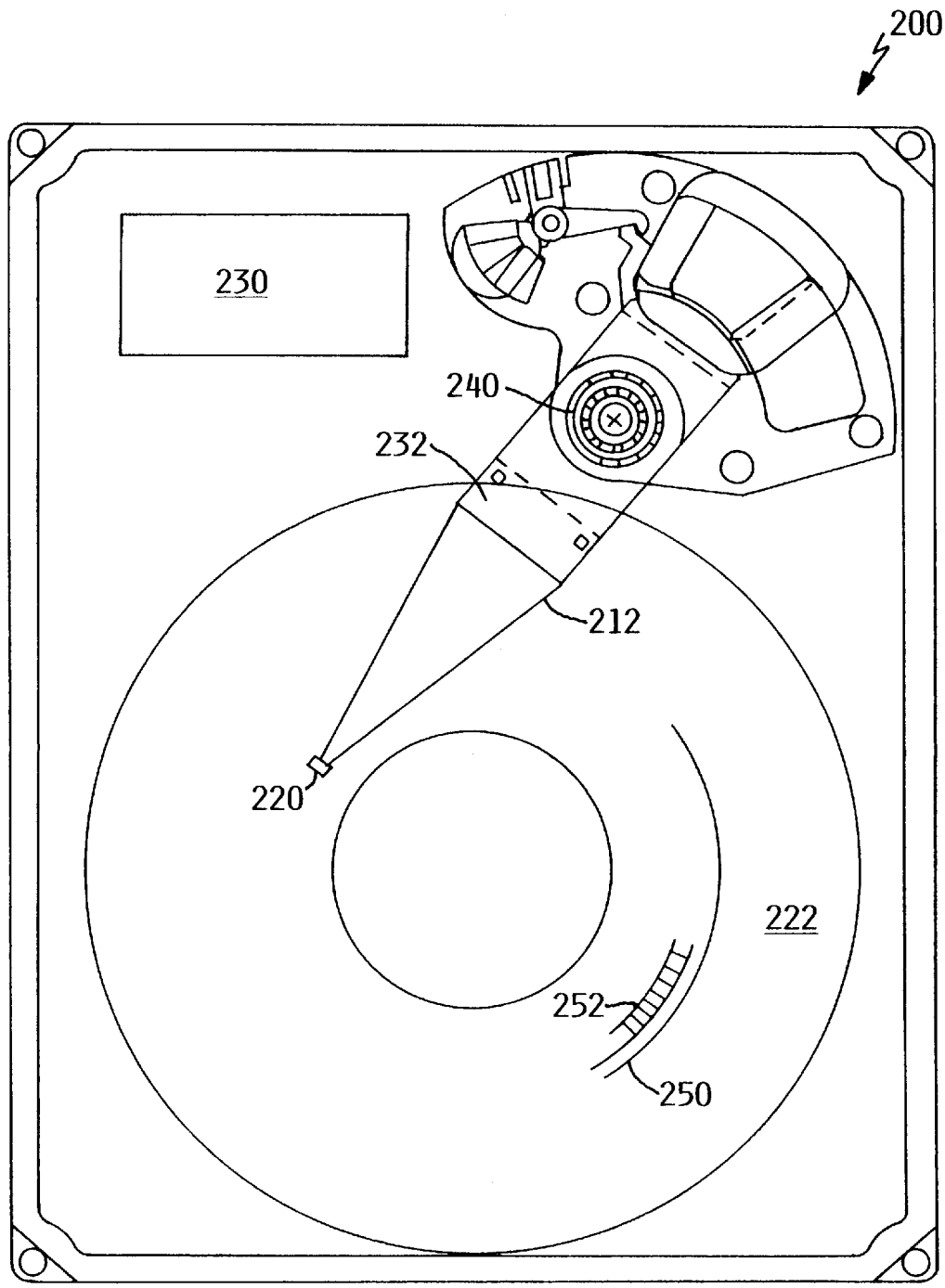
FIG. 2 is a top view of the interior of the disk drive with the cover removed according to the present invention.

Referring now to FIGS. 1 and 2 of the drawings, there is shown a rigid magnetic disk drive unit generally designed as 100. Unit 100 is illustrated in greatly simplified form sufficient for an understanding of the present invention, and is not limited to the details of a particular drive unit construction.

Disk drive unit 100 includes a housing 114 enclosing a stack 116 of disks 118 having magnetic surfaces. Disks 118 included numerous data sectors arrayed in a concentric pattern in the magnetic medium provided by a layer of magnetic material on the disk surface. Disks 118 also include a pattern of servo sectors interlaced with the data sectors. The disks 118 are mounted in parallel for simultaneous rotation on and by an integrated spindle and motor assembly 126. The servo sectors and data sectors are read and/or written to by heads 128 movable across the disk surface. The disks are shown as single sided for simplicity, but most rigid magnetic disk drive units employ disks with opposed magnetic surfaces and transducer heads at both sides of each disk.

Heads 128 are mounted on flexure springs (not shown) carried by arms 132 ganged together for simultaneous pivotal movement about a support spindle 134. One of the arms 132 includes an extension 136 driven in a pivotal movement about a support spindle 134 by a head drive motor 138. Although several drive arrangements are commonly used, the illustrated motor 138 includes a coil 140 cooperating with a magnet and core assembly (not shown).

When a call for disk access is received in conventional manner by a control circuit 142, motor 126 is operated to rotate the disk stack 116 and the control circuit employs known servo control principles to move the data heads 128 into a selected radial position with one head 128 aligned with a track where data is to be read or written. This positioning operation utilized feedback control via servo sectors to locate the head in a specific radial position. A position error signal is detected as the servo sectors are read and the position error signal is communicated to the control circuit 142 for feedback controlled energization of the voice coil motor 138.

Position information signals may include signals that are written to the servo sectors with a timing deviation in the form of a phase skew in sequence from track to track. This position information is typically prerecorded on disks 118 incident to the manufacture of the disk drive unit 100. Accordingly, the relative phase differences between adjacent tracks are detected and used by control circuit 142 as an indication of radial head position. Since the heads 128 must be aligned relative to the disks 118 with a high degree of accuracy, it is important that the position error signal be as linear as possible with consistent gain during radial movement.

FIG. 2 is a top view 200 of the interior of the disk drive with the cover removed, and illustrates in better detail the suspension 212 that provides a force to the slider 220 to urge it toward the disk 222. The suspension 212 also provides a gimbaled attachment of the slider 220 which allows the slider 220 to pitch and roll as it rides on the air bearing. The data detected from disk 222 by the transducer on slider 220 is processed into a data readback signal by signal amplification and processing circuitry in the integrated circuit arm electronics (AE) module 230 located near arm 232. The actuator arm 232 is pivotal about axis 240 to move the slider 220 to a desired radial position. Tracks 250 are located at radial positions on the disk 222. Servo and data sectors 252 are angularly spaced around the disk in the tracks 250. The data and servo sectors are described in more detail with reference to FIG. 3.

Figure 3:
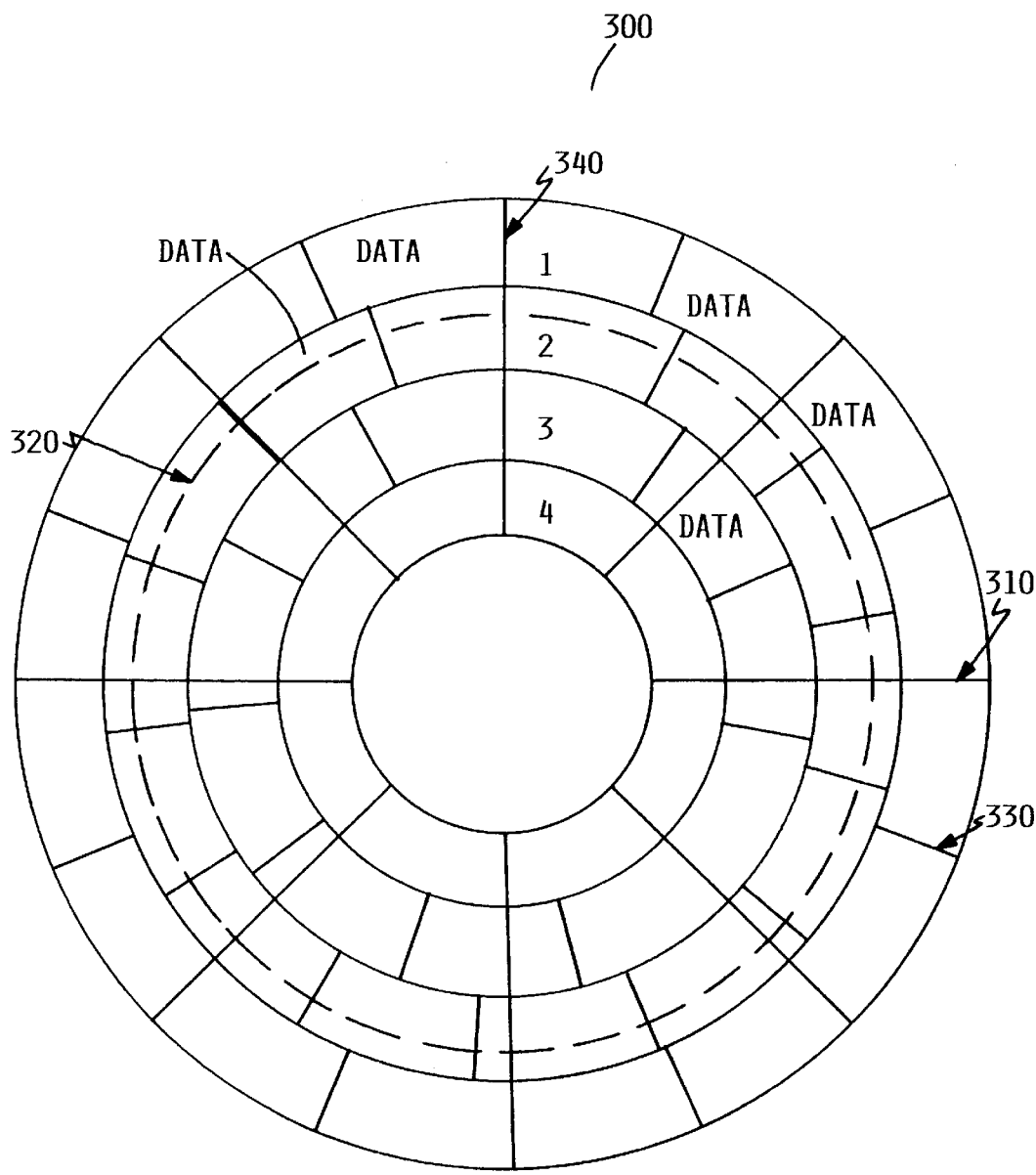
FIG. 3 illustrates a disk with embedded servo according to the present invention.

FIG. 3 illustrates a disk with embedded servo 300. Embedded servo is emerging as the leading servo implementation for the next several generations of hard disk drive products. Embedded servo overcomes the limitations of dedicated servos by interspersing the servo information with the data in the form of prerecorded servo sectors 310 recorded on each of the tracks 320 along with data sectors 330. The disk 300 in FIG. 3 shows sectors arranged according to zone bit recording, wherein the number of sectors per track is dependent upon the cylinder circumference, e.g., tracks on the outside cylinders have more sectors per track than the inside cylinders. An index position 340 indicates the start of each track.

When the heads arrive at the intended track location, they read the servo sector 310 and send back the information to the drive electronics. Then, the drive electronics adjust the position of the actuator motor, which positions the heads so that the decoded position error signals (PES) from the servo sectors 310 are zero, i.e., the PES is zero only when the head is exactly over the center of the track.

Figure 4:
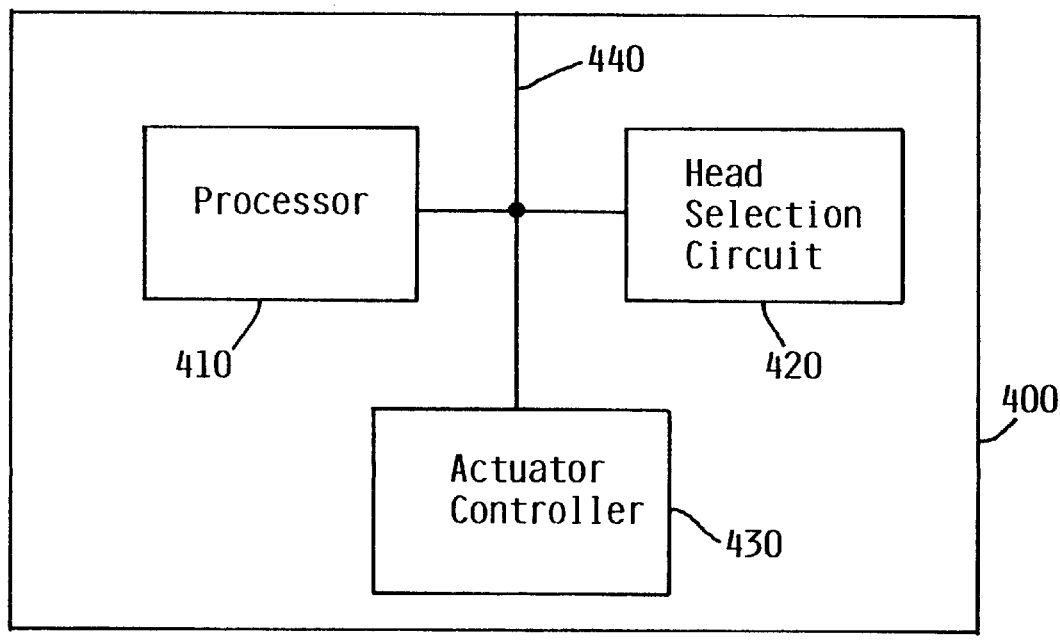
FIG. 4 illustrates a block diagram of the controller according to the present invention.

FIG. 4 illustrates a block diagram of the controller 400. The controller includes a processor 410 for calculating velocity deviations for each of the plurality of heads to determine a set of suitable seek heads from the plurality of heads. A head selection circuit 420 is coupled to the processor 410 for switching from a current head to a preferred head from the set of suitable seek heads. An actuator controller 430 is coupled to the processor 410 for seeking with the preferred head to a virtual track corresponding to a target track. The processor 410 calculates a preferred/target runout difference for smoothing the settle of the preferred head and the head selection circuit 420 switches from the preferred head to a target head aligned with the target track. Control signals are provided to the storage device via output line 440.

Figure 5:
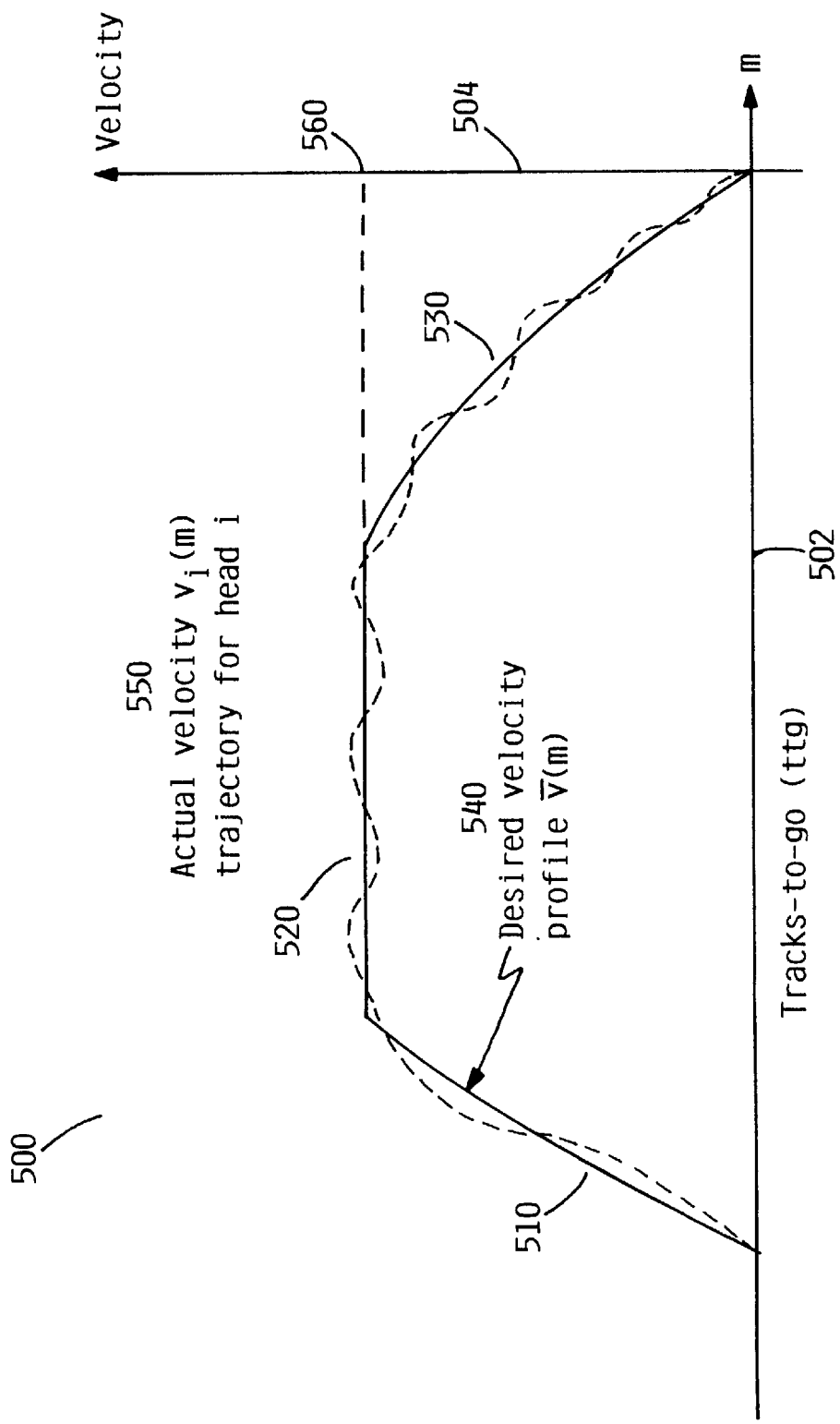
FIG. 5 illustrates a graph of a desired and actual velocity profile according to the present invention.

FIG. 5 illustrates a graph 500 of a desired and actual velocity profile. The graph 500 plots the tracks-to-go 502 against velocity 504. There are variations in the dynamics of how each head suspension arm relates to the servo system. A track access involves the seek 510, a period of relatively constant velocity (coast) 520, and the settle 530 wherein the track follow the target track until the data of interest is reached. To access a data track, a desired velocity profile 540 is followed. The velocity profile is stored in memory, and a velocity estimator is used to estimate the radial velocity required by a prescribed velocity profile. Initially, the head is accelerated 510 and then the head may coast 520 for some period of time, e.g., on a long seek. The head will coast at some maximum velocity 560 and then decelerate 530 to finally settle down on the desired track. However, if the actual velocity 550 is measured and compared to the desired velocity 540 of the velocity profile 500, a velocity deviation may be obtained.

By summing the velocity differences over an access, a performance number may be derived. The lower the value for the performance number, the better the access because you are following the desired velocity profile 540 closer. A figure of merit velocity deviation is calculated as follows:

$$VD_i = \sum_{n=0, j=1, \ldots M}^{N} (v_i(n) - \overline{v}(n))^2,$$

where M is the number of heads and N is the number of servo samples during seek and settle. The head index i=1, 2, ... M, and sector index n=0, 1, 2, ..., N. The seek and settle performance can be measured during an access by summing the velocity deviation from the desired velocity profile at each servo sector. For multiple similar inbound and outbound seeks $VD_i$ can be determined for each head. The heads with the smallest overall $VD_i$=minimum($VD_i$) form the set of heads which are for accessing. The calculations should be done periodically as background process in order not to impact performance. Once the most suitable seek-heads are picked, the seek can be performed.

The velocity profile 500 is normally set so that it will be the same for all heads. But when this difference is calculated, one head may be better than another. So the head having the lower performance number $VD_i$ is the head used for the seek. In addition, there may be differences between outbound seeks and inbound seeks. Thus, a first set of preferred heads could be selected for performing inbound seeks and a second set of preferred heads could be selected for outbound seeks. Alternatively, a single set of heads could be selected for both type of seeks. To accommodate changing system characteristics, the sets of preferred heads may be updated. Further, since there is a tendency for heads to deteriorate with use, the same head would probably not be constantly used for the seek operation. Accordingly, if only a single head is selected as a preferred head, seeks could be distributed over the best seek head and the second best seek head.

Figure 6:
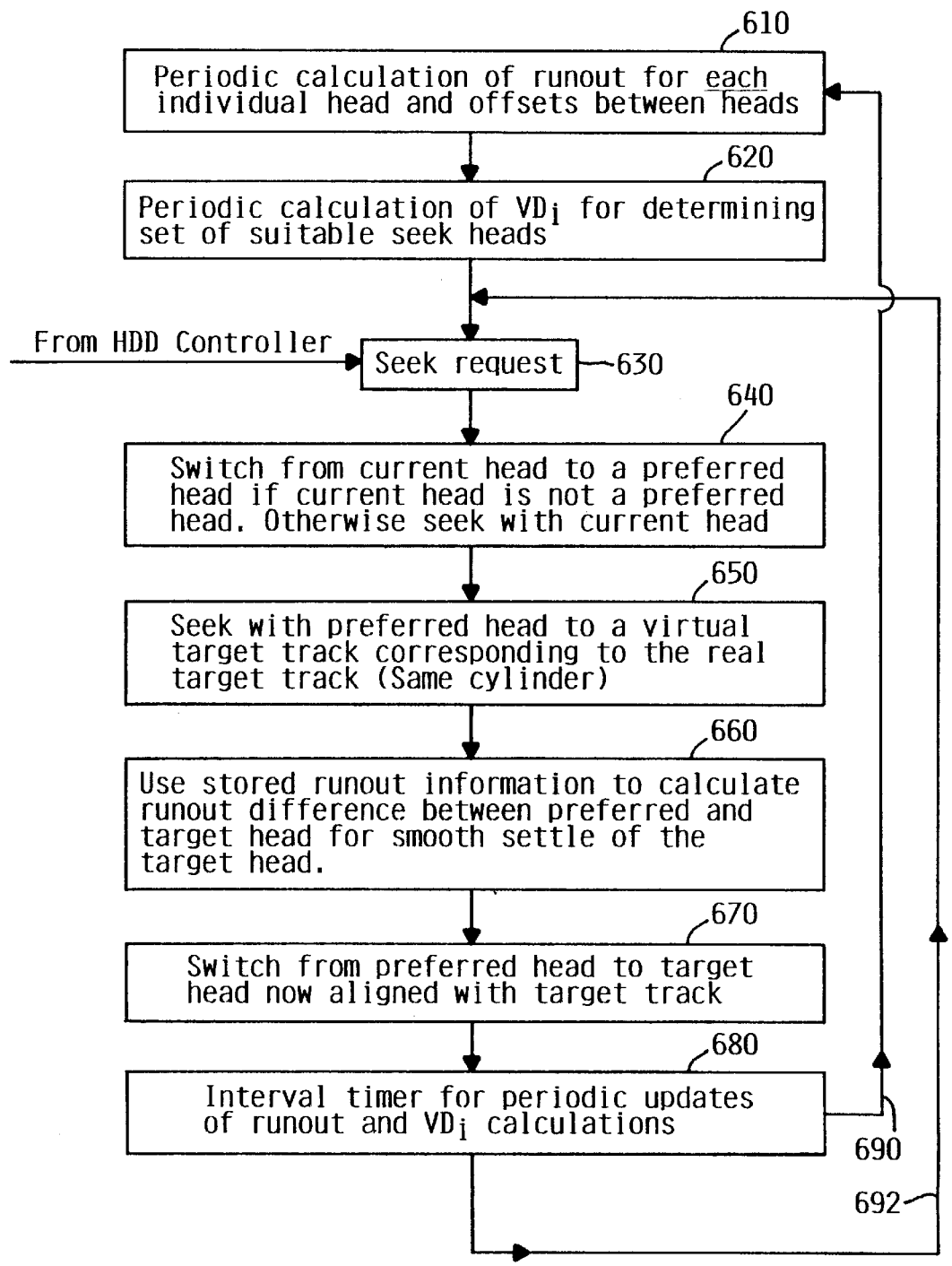
FIG. 6 illustrates a flow chart for the method of optimizing the seek/settle performance of a storage device according to the present invention.

FIG. 6 illustrates a flow chart 600 for the method of optimizing the seek/settle performance of a storage device. The present invention takes advantage of the capability to measure seek/settle performance in-situ and uses the head switch function. The runout for each individual head and relative offset between heads are calculated periodically 610. This is performed during an off-line calibration mode. Next, the velocity deviations or the $VD_i$ for heads is calculated to determine a set of seek heads 620. A seek request is received 630 and then a switch from a current head to a preferred head is made if the current head is not a preferred head 640. After the head switch, if necessary, a seek is performed with a preferred head to a virtual target track corresponding to the real target track 650, i.e., the same cylinder. The stored runout information is used to calculate runout difference between the preferred and target heads for a smooth settle of the target head 660. Then, a switch from the preferred head to the target head is performed 670. The target head is aligned at this point with the target track. Thereafter, a periodic timer is checked 680. The periodic timer determines whether the periodic calculations of runout and velocity differences need to be performed 690. If not, the process cycles back for another seek request 692.

Figure 7:
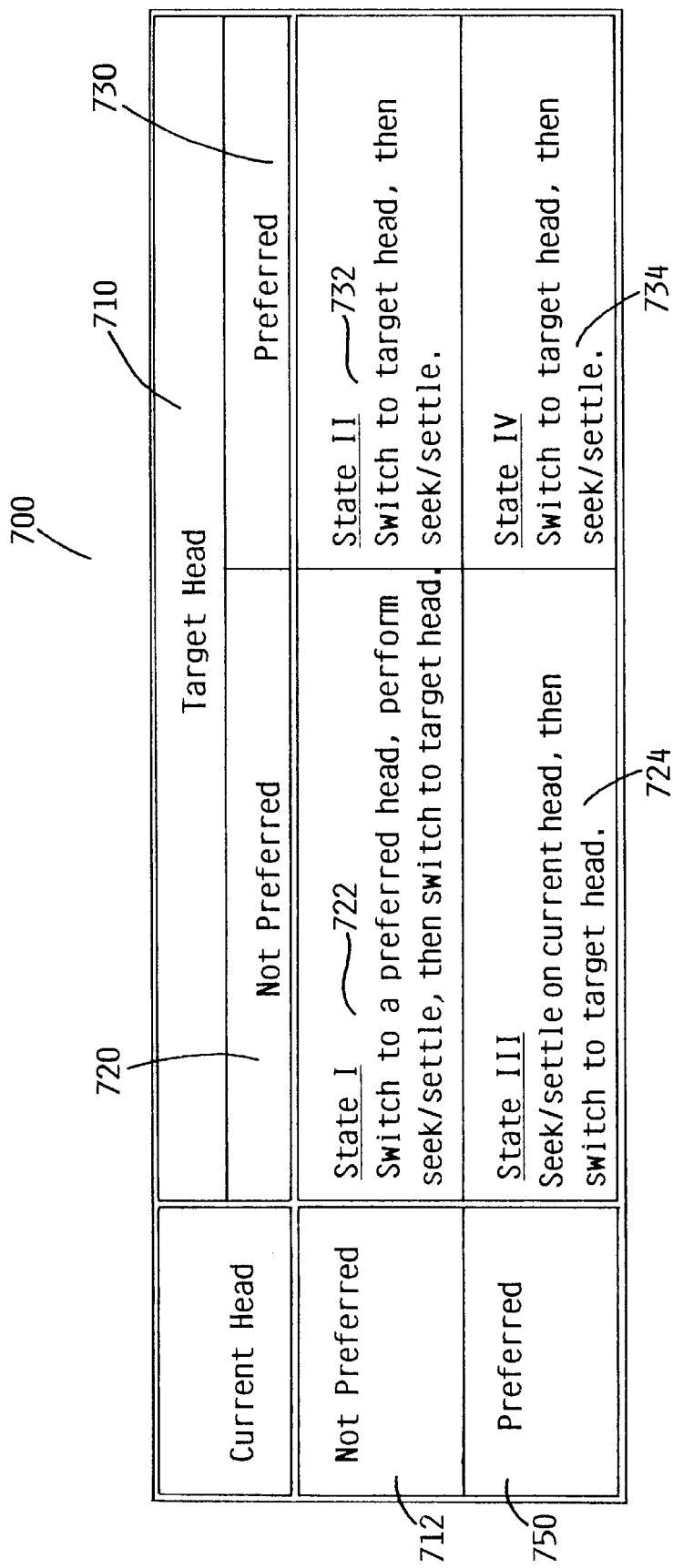
FIG. 7 is a table illustrating the states for the seek/settle performance optimization according to the present invention.

FIG. 7 is a table 700 illustrating the states for the seek/settle performance optimization. Two states exist for the target head 710 if the current head is not a preferred head 712. First, if the target head is not preferred 720, a switch is made to a preferred head, the seek/settle is performed and then a switch is made to the target head 722. If the target head is a preferred head 730, a switch is made to the target head and then the seek/settle is performed 732.

Likewise, two states exist for the target head 710 if the current head is a preferred head 750. First, if the target head is not preferred 720, seek/settle is performed and then a switch is made to the target head 724. If the target head is a preferred head 730, a switch is made to the target head and then the seek/settle is performed 734.

Typically the head switch and final settle for read operations is done in less than one servo sector period.

Variations in settling time for "good" and "poor" seek-heads can be several sector periods. Thus, the use of a preferred seek-head followed by a head switch will improve the average seek/settle time for the disk drive. It will also insure a more smooth motion. Motion-jerks can be caused by the previously mentioned factors during the access period. It may not be necessary to use this method for very short seeks. There may also be situations where outbound seeks are more efficiently done on different heads than inbound seeks and/or different seek heads for various portions of the data band. In the latter case, for long seeks, crossing several of these regions, the heads required in the settle-region would be used as the preferred seek heads.

Among the advantages according to the present invention, the seek method is shorter and the overall settle performance is smoother with less variation among all seeks. Servo tuning of the seek/settle algorithm is simplified, since only good seek performers would be involved instead of using all heads—both good and bad. There would also be fewer seek-errors and/or potential loss of control, i.e., hitting into the crash-stop. The method according to the present invention requires only a microcode upgrade, allowing existing drives to be upgraded in the field.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A controller for moving a plurality of heads relative to recording media during seek operations, the controller comprising:

a processor for calculating velocity deviations for each of the plurality of heads to determine a set of suitable seek heads from the plurality of heads;

a head selection circuit, coupled to the processor, for switching from a current head to a preferred head from the set of suitable seek heads; and an actuator controller, coupled to the processor, for seeking with the preferred head to a virtual track corresponding to a target track;

wherein the processor calculates a preferred/target runout difference for smoothing the settle of the preferred head and the head selection circuit switches from the preferred head to a target head aligned with the target track.

2. The controller of claim 1 wherein the current head is the preferred head.

3. The controller of claim 1 wherein the preferred head is the target head.

4. The controller of claim 1 wherein the preferred/target runout difference comprises the differences between the runout for the preferred head and the target head for N sectors.

5. The controller of claim 4 wherein the preferred/target runout differences is provided to the actuator controller upon calculation by the processor.

6. The controller of claim 1 wherein the head selection circuit switches from the preferred head to a target head aligned with the target track at a predetermined period before the target head is positioned at the target track.

7. The controller of claim 1 wherein the preferred head is a randomly selected head from the set of suitable seek heads.

8. The controller of claim 1 wherein the head selection circuit switches from the preferred head to a target head aligned with the target track in less than one servo sector period.

9. A storage device, comprising:

a plurality of recording media;

a plurality of read/write heads for reading and writing data on the recording media;

a driver for moving the recording media relative to the plurality of read/write heads; and a controller for moving the plurality heads relative to recording media during seek operations, the controller further comprising:

a processor for calculating velocity deviations for each of the plurality of heads to determine a set of suitable seek heads from the plurality of heads;

a head selection circuit, coupled to the processor, for switching from a current head to a preferred head from the set of suitable seek heads; and an actuator controller, coupled to the processor, for seeking with the preferred head to a virtual track corresponding to a target track;

wherein the processor calculates a preferred/target runout difference for smoothing the settle of the preferred head and the head selection circuit switches from the preferred head to a target head aligned with the target track.

10. The disk drive of claim 9 wherein the current head is the preferred head.

11. The disk drive of claim 9 wherein the preferred head is the target head.

12. The disk drive of claim 9 wherein the preferred/target runout difference comprises the differences between the runout for the preferred head and the target head for N sectors.

13. The disk drive of claim 12 wherein the preferred/target runout differences is provided to the actuator controller upon calculation by the processor.

14. The disk drive of claim 9 wherein the head selection circuit switches from the preferred head to a target head aligned with the target track at a predetermined period before the target head is positioned at the target track.

15. The disk drive of claim 9 wherein the preferred head is a randomly selected head from the set of suitable seek heads.

16. The disk drive of claim 9 wherein the head selection circuit switches from the preferred head to a target head aligned with the target track in less than one servo sector period.

17. A method of optimizing the seek/settle performance of a disk drive, comprising the steps of:

calculating velocity deviations for each of the plurality of heads to determine a set of suitable seek heads from the plurality of heads;

switching from a current head to a preferred head from the set of suitable seek heads; and seeking with the preferred head to a virtual track corresponding to a target track;

calculating a preferred/target runout difference for smoothing the settle of the preferred head; and switching from the preferred head to a target head aligned with the target track.

18. The method of claim 17 wherein the current head is the preferred head.

19. The method of claim 17 wherein the preferred head is the target head.

20. The method of claim 17 wherein the step of calculating the preferred/target runout difference further comprises the step of calculating the differences between the runout for the preferred head and the target head for N sectors.

21. The method of claim 20 wherein the step of calculating the preferred/target runout differences further comprises the step of providing the calculated runout differences to an actuator controller upon calculation.

22. The method of claim 17 wherein step of switching from the preferred head to a target head further comprises the step of making the switch from the preferred head to the target head at a predetermined period before the target head is positioned at the target track.

23. The method of claim 17 wherein the step of switching to a preferred head further comprises the step of randomly selecting a head from the set of suitable seek heads.

24. The method of claim 17 wherein the step of switching from the preferred head to a target head further comprises the step of making the switch from the preferred head to a target head in less than one servo sector period.

* * * * *